United States Patent
De Graaf et al.

(10) Patent No.: US 11,518,128 B2
(45) Date of Patent: Dec. 6, 2022

(54) TIRE BUILDING DRUM WITH A BLADDER OR SLEEVE

(71) Applicant: VMI HOLLAND B.V., Epe (NL)

(72) Inventors: Martin De Graaf, Epe (NL); Dave Papot, Epe (NL); Tom Regterschot, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 17/275,600

(22) PCT Filed: Jul. 31, 2019

(86) PCT No.: PCT/NL2019/050507
§ 371 (c)(1),
(2) Date: Mar. 11, 2021

(87) PCT Pub. No.: WO2020/055237
PCT Pub. Date: Mar. 19, 2020

(65) Prior Publication Data
US 2021/0283874 A1    Sep. 16, 2021

(30) Foreign Application Priority Data

Sep. 11, 2018  (NL) .................................... 2021600

(51) Int. Cl.
*B29D 30/26*  (2006.01)
*B29D 30/32*  (2006.01)

(52) U.S. Cl.
CPC ............. *B29D 30/26* (2013.01); *B29D 30/32* (2013.01); *B29D 2030/2621* (2013.01);
(Continued)

(58) Field of Classification Search
CPC ........ B29D 30/24; B29D 30/26; B29D 30/32; B29D 2030/2614; B29D 2030/2621;
(Continued)

(56) References Cited

U.S. PATENT DOCUMENTS

| 3,160,546 A | * | 12/1964 | Burton | ................... | B29D 30/32 |
| | | | | | 156/416 |
| 3,476,633 A | * | 11/1969 | Henley | ................ | B29D 30/247 |
| | | | | | 156/416 |

(Continued)

FOREIGN PATENT DOCUMENTS

| CN | 101298192 | 11/2008 | ............. B29D 30/22 |
| CN | 102300701 | 4/2015 | ............. B29D 30/24 |

(Continued)

OTHER PUBLICATIONS

Chinese Office Action issued in Chinese Patent Appln. Serial No. 201910868399.8, dated Feb. 21, 2022, with machine translation, 14 pages.

(Continued)

*Primary Examiner* — Geoffrey L Knable
(74) *Attorney, Agent, or Firm* — Hayes Soloway P.C.

(57) ABSTRACT

Disclosed is a tire building drum with a first bladder or sleeve, wherein the tire building drum has a first release member and a first actuator for generating a relative movement between the first release member and the drum body to move the first release member in a first release direction with respect to the drum body from a first fixation position in which the first release member fixates the first circumferential edge of the first bladder or sleeve to the drum body into a first release position in which the first release member releases the first circumferential edge from the drum body. Also disclosed is a method for operating the aforementioned tire building drum.

21 Claims, 11 Drawing Sheets

(52) U.S. Cl.
CPC ............... *B29D 2030/2635* (2013.01); *B29D 2030/3228* (2013.01); *B29D 2030/3242* (2013.01)

(58) Field of Classification Search
CPC .... B29D 2030/2628; B29D 2030/2635; B29D 2030/3221; B29D 2030/3228; B29D 2030/3235; B29D 2030/3242
See application file for complete search history.

(56) References Cited

U.S. PATENT DOCUMENTS

| | | | | |
|---|---|---|---|---|
| 3,695,974 | A * | 10/1972 | Henley | B29D 30/24 156/415 |
| 4,087,305 | A * | 5/1978 | Touchette | B29D 30/247 156/401 |
| 5,433,814 | A | 7/1995 | Nojiri et al. | 156/401 |
| 7,361,244 | B2 | 4/2008 | Tokunaga | B29D 30/26 |
| 8,881,785 | B2 | 11/2014 | De Graaf et al. | B29D 30/26 |
| 2001/0054485 | A1 | 12/2001 | Farinola | 156/416 |
| 2007/0131355 | A1 | 6/2007 | Ravat | 156/401 |
| 2021/0283874 | A1 | 9/2021 | De Graaf et al. | B29D 30/24 |

FOREIGN PATENT DOCUMENTS

| | | | | |
|---|---|---|---|---|
| CN | 105437582 | 3/2016 | ............ | B29D 30/32 |
| CN | 207825509 | 9/2018 | ............ | B29D 30/00 |
| CN | 211683610 | 10/2020 | ............ | B29D 30/24 |
| CN | 212795981 | 3/2021 | ............ | B29D 30/24 |
| EP | 0 492 239 | 12/1991 | ............ | B29D 30/32 |
| EP | 1 798 022 | 6/2007 | ............ | B29D 30/24 |
| GB | 983349 | 2/1965 | | |
| JP | 2002-52623 | 2/2002 | ............ | B29D 30/26 |
| JP | 2011-520662 | 7/2011 | ............ | B29D 30/32 |
| JP | 2014-509277 | 4/2014 | ............ | B29D 30/26 |
| WO | WO2009/142482 | 11/2009 | ............ | B29D 30/24 |
| WO | WO2012/108770 | 8/2012 | ............ | B29D 30/24 |
| WO | WO 2013/006300 | 1/2013 | ............ | B29D 30/18 |
| WO | WO 2018/111091 | 6/2018 | ............ | B29D 30/24 |

OTHER PUBLICATIONS

Search Report issued in Netherlands Patent Appln. Serial No. NL 2021600, dated May 3, 2019, 10 pages.
International Preliminary Report on Patentability issued in PCT/NL2019/050507, dated Mar. 9, 2021, 6 pages.
International Search Report and Written Opinion issued in PCT/NL2019/050507, dated Oct. 8, 2019, 10 pages.
Japanese Official Action issued in related Japanese Patent Application Serial No. 2020-508615, dated May 18, 2011 (6 pages).
Japanese Decision issued in related Japanese Patent Application Serial No. 2020-508615, dated Sep. 29, 2021 (5 pages).
Official Action issued in related Taiwanese Patent Application Serial No. 108127362, dated Oct. 3, 2022 (8 pages).

* cited by examiner

TIRE BUILDING DRUM WITH A BLADDER OR SLEEVE

BACKGROUND

The invention relates to a tire building drum with a bladder or sleeve and a method for operating said tire building drum.

U.S. Pat. No. 3,476,633 A discloses a tire building drum with a rubber sleeve. The rubber sleeve has a circular edge portion that is clamped to the shoulder portion of the drum with the use of a plurality of detachable caps. Each detachable cap is fastened to the drum with a number of flat head screws to the drum.

U.S. Pat. No. 3,160,546 A discloses a tire building drum with a sleeve and a plurality of locking mechanisms that are movable into an open and closed position to engage and disengage the ends of the sleeve. Each locking mechanism comprises a linkage that is biased to the closed position and that can be flipped into the open position.

SUMMARY OF THE INVENTION

A disadvantage of the known tire building drums is that their respective sleeves can only be released manually, i.e. by manually unscrewing each of the detachable caps or by manually flipping each of linkages. This is a time consuming effort. Moreover, the edge portions of sleeves and bladders are not always easily accessible. Typically, sections have to be spaced apart or removed entirely to gain access for manual removal. In some cases, in particular with turn-up bladders, the bladder at least partially folds down onto itself, thus blocking access to its edge portions.

It is an object of the present invention to provide a tire building drum with a bladder or sleeve and a method for operating said tire building drum, wherein the bladder or sleeve can be removed more easily.

According to a first aspect, the invention provides a tire building drum with a first bladder or sleeve, wherein the tire building drum comprises a drum body that is rotatable about a central axis extending in an axial direction, wherein the first bladder or sleeve has a first circumferential edge and a second circumferential edge opposite to the first circumferential edge in the axial direction, wherein the first circumferential edge and the second circumferential edge extend in a circumferential direction about the central axis around the drum body, wherein the tire building drum comprises a first release member and a first actuator for generating a relative movement between said first release member and the drum body to move said first release member in a first release direction with respect to the drum body from a first fixation position in which the first release member fixates the first circumferential edge to the drum body into a first release position in which the first release member releases the first circumferential edge from the drum body.

The first circumferential edge of the first bladder or sleeve can be removed from the drum by remotely actuating the first release member. No manual actions are required at the first release member to release the first circumferential edge. Hence, even sleeves or bladders with inaccessible circumferential edges can be removed relatively easily.

In a preferred embodiment the first release member is a first remote controlled release member, wherein the first actuator is arranged for moving said first remote controlled release member from the first fixation position into the first release position. Hence, the first release member can be remotely controlled by the first actuator with respect to the drum body.

In a preferred embodiment the first release member is arranged to be remote controlled from a position that is spaced apart from the first fixation position over at least twenty centimeters, preferably at least thirty centimeters and most preferably at least forty centimeters. Said spacing between the first release member and its control can facilitate the remote control of the first release member without having to reach all the way up to the first release member itself.

In a further embodiment the first release direction is parallel or substantially parallel to the central axis. The first release member can therefore be moved in the same direction as most axially controlled components of the tire building drum.

In a further embodiment the first actuator is a linear actuator that acts in the first release direction. A linear actuator can provide a linear stroke, similar to other controlled strokes in the tire building drum.

In a further embodiment the tire building drum is arranged to be connected to one or more drive elements, wherein the first actuator is arranged to be driven by one of the one or more drive elements. The first actuator can thus be driven by drive elements that are not part of the tire building drum itself.

In an embodiment thereof the tire building drum is arranged to be mounted concentrically to a drum shaft at the central axis, wherein the one or more drive elements extend inside, at or alongside the drum shaft. By connecting the first actuator to drive elements close to or in the drum shaft, the outer circumferential surface of the tire building drum can be kept free from said drive elements.

In an embodiment thereof the drum shaft houses the one or more drive elements, wherein the first actuator is arranged to be driven by said one drive element inside the drum shaft. This is particularly useful when the first release member is inaccessible from the outside of the tire building drum.

In a further embodiment thereof the first actuator is arranged to be mechanically connected to said one drive element. Preferably, said one drive element is a spindle or a push-pull rod, wherein the first actuator is a coupling member that is arranged to be mechanically coupled to the spindle or the push-pull rod. The mechanical connection can provide an accurate control over the first actuator.

In an alternative embodiment said one drive element is a pneumatic or hydraulic conduit that is connected to an external source of pneumatic pressure, partial vacuum or hydraulic pressure, wherein the first actuator is a chamber or a cylinder that is arranged to be connected in fluid communication with the one drive element. The tire building drum can accommodate many relatively small conduits to control various functions of the tire building drum. One of these conduits can effectively be used to control the alternative first actuator.

In another alternative embodiment said one drive element is an electrical conductor, wherein the first actuator is an electromechanical actuator that is arranged to be electrically conductively coupled to the one drive element. The tire building drum may already be powered electrically for various purposes. Hence, said electric power may also be effectively used to power said actuator.

In another embodiment the first release member is arranged to release the entire first circumferential edge from the drum body in the release position. In particular, the first release member is an annular member extending in the circumferential direction about the central axis to fixate and release the entire first circumferential edge in the first fixation position and the first release position, respectively. Hence, the first circumferential edge can be released instantaneously, without requiring the repeated time consuming manual operations of the prior art to progressively release said first circumferential edge.

In another embodiment the tire building drum comprises a biasing member to bias the first release member from the first release position into the first fixation position in a biasing direction opposite to the first release direction. By biasing the first release member, the first release member can be automatically returned to the first fixation position.

In another embodiment the first actuator is arranged for driving at least one other component of the tire building drum during a tire building operation. The first actuator can therefore be used for multiple purposes.

In an embodiment thereof the first actuator is arranged to travel back and forth within a tire building stroke during the tire building operation to drive the at least one other component, wherein the first release member is arranged to remain in the first fixation position during the tire building stroke, wherein the first actuator is arranged to travel further in the first release direction beyond the tire building stroke to move the first release member from the first fixation position into the first release position. The travel of the first actuator outside the tire building stroke conveniently does not interfere with the operation of the tire building drum inside the tire building drum. Hence, it can be prevented that the first bladder or sleeve is accidentally released during the tire building operation.

In an embodiment thereof the tire building drum comprises a plurality of arms distributed around the drum body in the circumferential direction and pivotable between a rest position at the drum body and a pressing position at least partially away from the drum body, wherein the at least one other component comprises the plurality of arms. Hence, the first actuator can drive the pivoting movement of the arms, as well as the release of the first circumferential edge of the first bladder or sleeve from the drum body.

In an embodiment thereof the plurality of arms are hingably coupled to the first release member to pivot relative to the first release member between the rest position and the pressing position, wherein the first actuator is connected to each of the arms via a respective link to convert the tire building stroke of the first actuator in the first release direction into a pivoting movement of the arms relative to the first release member, wherein the tire building drum is provided with a resting surface that supports the plurality of arms in the rest position with respect to the drum body, wherein the links in the rest position are arranged to transmit further movement of the first actuator in the first release direction via the plurality of arms onto the first release member. The rest position of the arms at the end of the tire building stroke thus effectively converts said arms into a rigid connection between the first actuator and the first release member.

In an embodiment thereof the first actuator is arranged to exert a return force onto the plurality of arms via the respective links, wherein at least a component of the return force is directed in the first release direction, wherein the tire building drum comprises a biasing member to bias the first release member from the first release position into the first fixation position with a biasing force in a biasing direction opposite to the first release direction, wherein the biasing force exceeds the return force during the tire building stroke. The biasing force can therefore prevent that the first release member moves towards the first release position prior to reaching the end of the tire building stroke.

In another embodiment the tire building drum comprises a second release member that is movable with respect to the drum body in a second release direction from a second fixation position in which the second release member fixates the second circumferential edge to the drum body into a second release position in which the second release member releases the second circumferential edge from the drum body. Consequently, both the circumferential edges of the first bladder or sleeve can be released and fixated in substantially the same way. Preferably, the second release member is a second remote controlled release member.

In an embodiment thereof the first release direction and the second release direction are the same.

In a further embodiment thereof the tire building drum comprises a second actuator for moving said second release member in the second release direction. The first actuator and the second actuator can be controlled individually, i.e. when only one circumferential edge is to be released or when the circumferential edges are to be released in a specific order.

Alternatively, the first release member and the second release member are connected to move in unison from the first fixation position and the second fixation position into the first release position and the second release position, respectively. Hence, both release members can be remotely controlled by the same actuator.

Preferably, the base comprises a bead-lock segment that is expandable in a radial direction perpendicular to the central axis, wherein the first release member and the second release member are arranged on opposite sides of the bead-lock segment in the axial direction, wherein the tire building drum comprises a bridge member to connect the first release member to the second release member, wherein the bead-lock segment comprises an opening that allows passage of the bridge member through the bead-lock segment in the axial direction. Hence, despite the presence of the bead-lock segment, both release members can be remotely controlled by the same actuator.

In another embodiment the tire building drum comprises a second bladder or sleeve with a third circumferential edge that extends in a circumferential direction about the central axis around the drum body, wherein the tire building drum further comprises a third release member that is movable with respect to the drum body in a third release direction from a third fixation position in which the third release member fixates the third circumferential edge to the drum body into a third release position in which the third release member releases the third circumferential edge from the drum body. Hence, not only the first circumferential edge and/or the second circumferential edge of the first bladder or sleeve, but also the third circumferential edge of the second bladder or sleeve can be released in substantially the same way. Preferably, the third release member is a third remote controlled release member.

In an embodiment thereof the third release direction is opposite to the first release direction.

In a further embodiment thereof the tire building drum comprises a third actuator for moving said third release member in the third release direction. The first actuator, the second actuator and/or the third actuator can be controlled individually, i.e. when only one circumferential edge is to be released or when the circumferential edges are to be released in a specific order.

In another embodiment the tire building drum comprises a center section for shaping a carcass and a turn-up section for turning-up one or more tire components against the shaped carcass at the center section, wherein the first bladder or sleeve is a turn-up bladder that is arranged to be expanded at the turn-up section.

In an embodiment thereof the turn-up bladder comprises an inflatable bladder body extending between the first circumferential edge and the second circumferential edge, wherein the bladder body, when uninflated, folds onto itself about a fold line at a side of the first circumferential edge opposite to the second circumferential edge in the axial direction, wherein the first release member is located in the axial direction between the second circumferential edge and the fold line of the uninflated bladder body and covered by said uninflated bladder body in a radial direction perpendicular to the central axis. The covered first release member is inaccessible from the radial outside of the tire building drum and can therefore be conveniently remotely controlled by the first actuator.

In an embodiment thereof the first release member is arranged to be remote controlled from a position outside of the uninflated bladder body in the axial direction. Preferably, the first release member is arranged to be remote controlled from a position beyond the fold line of the uninflated bladder body in the first release direction. Hence, the position where the first release member can be controlled can be offset, i.e. by the actuator and/or the one or more drive elements, to a position outside of the area of the drum body that is inaccessible because of the presence of the uninflated bladder body.

In a further embodiment thereof the second bladder or sleeve is a center sleeve that is arranged to be expanded at the center section.

In another embodiment the first actuator is removable from the tire building drum. The actuators may for example be coupled to the first release member only when said first release member is to be moved.

According to a second aspect, the invention provides a tire building machine comprising a tire building drum according to any one of the aforementioned embodiments, wherein the tire building machine further comprises one or more drive elements, wherein the first actuator is arranged to be driven by one of the one or more drive elements. Preferably, the tire building machine further comprises a control unit that is arranged for controlling the one drive element such that the first release member is moved from the first fixation position into the first release position. The control unit may comprise computer readable instructions to automate the release of the first bladder or sleeve.

According to a third aspect, the invention provides a method for operating a tire building drum according to any one of the aforementioned embodiments, wherein the method comprises the step of controlling the first actuator to generate a relative movement between the first release member and the drum body to move said first release member in the first release direction with respect to the drum body from the first fixation position into the first release position to release the first circumferential edge from the drum body.

The method relates to the practical operation of the aforementioned tire building drum and thus has the same technical advantages, which will not be repeated hereafter.

In an embodiment thereof the first release member releases the entire first circumferential edge from the drum body in the release position.

In a further embodiment thereof the tire building drum comprises a second release member that is movable with respect to the drum body in a second release direction from a second fixation position in which the second release member fixates the second circumferential edge to the drum body into a second release position in which the second release member releases the second circumferential edge from the drum body, wherein the method further comprises the step of generating a relative movement between the second release member and the drum body to move the second release member in the second release direction with respect to the drum body from the second fixation position into the second release position to release the second circumferential edge from the drum body.

In one embodiment thereof the tire building drum comprises a second actuator for moving said second release member in the second release direction.

In an alternative embodiment thereof the first release member and the second release member are connected to move in unison from the first fixation position and the second fixation position into the first release position and the second release position, respectively.

In a further embodiment thereof the tire building drum comprises a second bladder or sleeve with a third circumferential edge that extends in a circumferential direction about the central axis around the drum body, wherein the tire building drum further comprises a third release member that is movable with respect to the drum body in a third release direction from a third fixation position in which the third release member fixates the third circumferential edge to the drum body into a third release position in which the third release member releases the third circumferential edge from the drum body, wherein the method further comprises the step of generating a relative movement between the third release member and the drum body to move the third release member in the third release direction with respect to the drum body from the third fixation position into the third release position to release the third circumferential edge from the drum body. Preferably, the tire building drum comprises a third actuator for moving said third release member in the third release direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
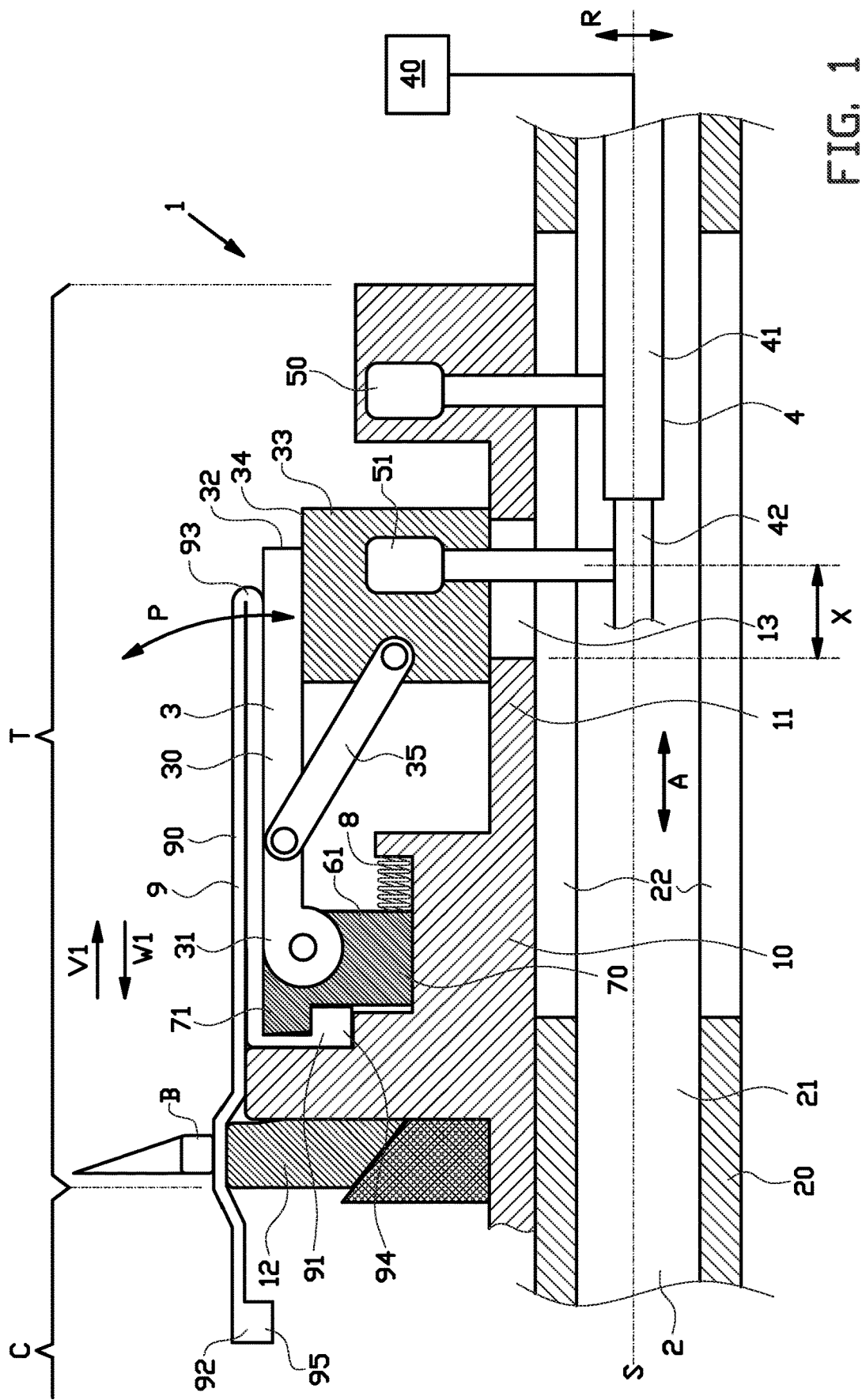
FIGS. 1 and 2 shows cross sections of a tire building drum with a turn-up bladder and a release member for releasing said turn-up bladder according to a first embodiment of the invention.
Figure 2:
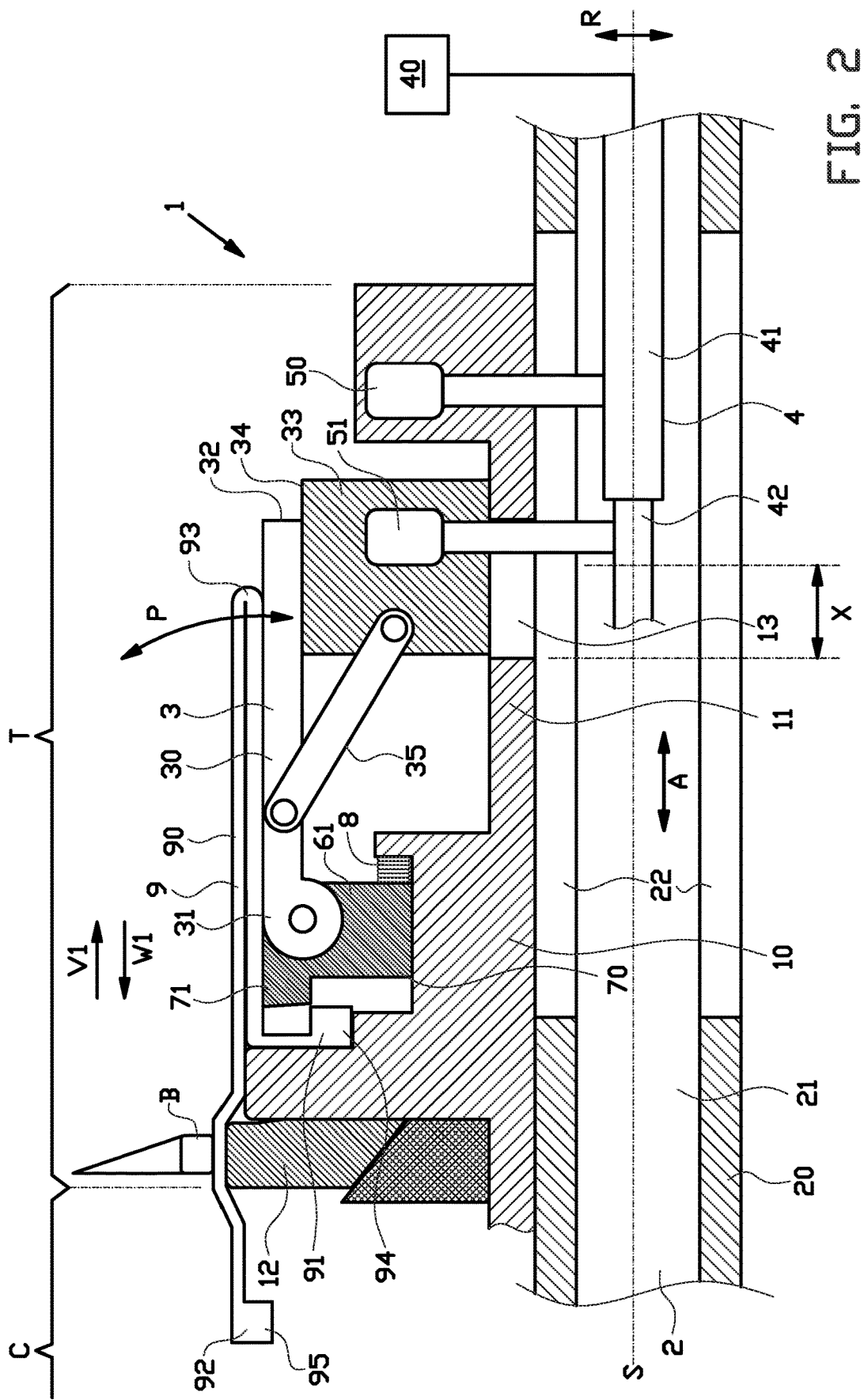

FIGS. 1 and 2 show a tire building machine for building green or unvulcanised tires according to a first embodiment of the invention.

The tire building machine comprises a tire building drum 1 and a drum shaft 2 for rotatably supporting the tire building drum 1 about a central axis S. The tire building drum 1 comprises a center section C for shaping a carcass (not shown) and a turn-up section T for turning-up tire components (not shown) around a bead B against the shaped carcass at the center section C. The turn-up section T is located adjacent to or on the outside of the center section C in an axial direction A parallel to the central axis S. The tire building machine comprises a similar turn-up section on the opposite side of the center section C in the axial direction A to form two drum halves. The tire building drum 1 extends in a circumferential direction around the central axis S. FIGS. 1 and 2 are simplified to only show the turn-up section T at one side of the central axis S.

The tire building drum 1 comprises a drum body 10 with a base 11 that is concentrically mounted to the drum shaft 2. The base 11 is slidable over the drum shaft 2 in an axial direction A parallel to the central axis S towards and away from the center section C in response to a shaping operation at said center section C. The drum body 10 further comprises a plurality of bead-lock segments 12 distributed circumferentially about the central axis S and expandable with respect to the base 11 in a radial direction R perpendicular to said central axis S in a manner known per se to lock or retain the bead B to the tire building drum 1. The drum body 10 further comprises one or more mechanical or pneumatic elements, known per se, to expand the carcass in the radial direction R at the center section.

In the context of the present invention, the drum body 10 is considered to be the assembly of components that form the tire building drum 1, except for the bladders or sleeves discussed hereafter. Said bladders or sleeves are arranged around and/or expandable relative to said drum body 10.

In this exemplary embodiment, the tire building drum 1 is provided with a turn-up bladder 9 for turning-up one or more tire components, i.e. body plies and/or sidewalls, around the bead B against the shaped carcass at the center section C. The turn-up bladder 9 comprises a first circumferential edge 91, a second circumferential edge 92 opposite to the first circumferential edge 91 in the axial direction A and a bladder body 90 extending between the first circumferential edge 91 and the second circumferential edge 92. The first circumferential edge 91 and the second circumferential edge 92 extend circumferentially about the central axis S around the drum body 10. At least the first circumferential edge 91 is arranged to be mounted to the drum body 10 in a position on the outside of the bead-lock segments 12 with respect to the center section C. The first circumferential edge 91 and the second circumferential edge 92 are provided with a flanges or rims 94, 95 that are arranged to be received on the drum body 10 and to be locked in place on said drum body 10 in a manner that will be described in more detail hereafter.

The tire building drum 1 according to the invention is provided with a release member 61 that is movable with respect to or relative to the drum body 10 into a fixation position, as shown in FIG. 1, to fixate the first circumferential edge 91 with respect to the drum body 10. The release member 61 is movable with respect to or relative to the drum body 10 in a release direction V1 from the fixation position, as shown in FIG. 1, into a release position, as shown in FIG. 2, to release the first circumferential edge 91 from the drum body 10. An operator may then perform maintenance on the turn-up bladder 9 or replace the turn-up bladder 9 in its entirety. The first circumferential edge 91 can again be fixed to the drum body 10 by moving the release member 61 in a fixation direction W1 opposite to the release direction V1 from the release position, as shown in FIG. 2, back into the fixation position, as shown in FIG. 1. In this exemplary embodiment, the release direction V1 and the fixation direction W1 are parallel or substantially parallel to the axial direction A.

The release member 61 is arranged to release the entire first circumferential edge 91 from the drum body 10 in the release position. In particular, the release member 61 is formed as or comprises an annular body 70 extending in the circumferential direction about the central axis S to fixate and release the entire first circumferential edge in the fixation position and the release position, respectively. The annular body 70 is provided with an annular flange or rim 71 that faces opposite to and/or engages with the flange or rim 94 of the first circumferential edge 91 to lock said first circumferential edge 91 in place on the drum body 11.

The bladder body 90 is inflatable such that it expands outwards with respect to the central axis S in the radial direction R. The turn-up bladder 9 is arranged to be mounted to the tire building drum 1 in a way such that it expands on the outside of the bead-lock segments 12 with respect to the center section C. Consequently, any tire components supported on said turn-up bladder 9 on the outside of the bead B are turned-up around said bead B against the shaped carcass at the center section C. The bladder body 90, when uninflated as shown in FIGS. 1 and 2, folds onto itself about a fold line 93 at a side of the first circumferential edge 91 opposite to the second circumferential edge 92 in the axial direction A. When uninflated, the release member 61 is located in the axial direction A between the first circumferential edge 91 and the fold line 93 of the bladder body 90. Hence, the release member 61 is covered by said uninflated bladder body 90 in the radial direction R and is inaccessible from the outside of the tire building drum 1.

In this exemplary embodiment, the tire building drum 1 is further provided with a plurality of arms 3 distributed around the drum body 10 in the circumferential direction. Each arm 3 comprises a hinge end 31, a distal end 32 opposite to the hinge end 31 and an arm body 30 extending between the hinge end 31 and the distal end 32. The arms 3 are pivotable about the hinge end 31 between a rest position at the drum body 10, as shown in FIGS. 1 and 2, and a pressing position in a pivoting direction P at least partially away from the drum body 10. The arms 3 are arranged to lie between the drum body 10 and the uninflated bladder body 90 in the rest position. Preferably, the arm body 30 extends parallel or substantially parallel to the axial direction A in said rest position. The hinge end 31 is located relatively close to the first circumferential edge 91 of the turn-up bladder 9 so that the arms 3 may be pivoted outwards to press against the turn-up bladder 9 in the pivoting direction P to force the turn-up bladder 9 against the shaped carcass at the center section C. In this particular example, the hinge ends 31 of the arms 3 are hinged on the release member 61.

As shown in FIGS. 1 and 2, the tire building drum 1 further comprises an arm support 33 that forms a resting surface 34 to support the plurality of arms 3 in the radial direction R in the rest position. In particular, the resting surface 34 prevents further radially inward movement of the arms 3 with respect to the central axis S beyond the rest position. The arm support 33 is slidable over the drum body 10 in the axial direction A. The arm support 33 is arranged to slide back and forth along or within a tire building stroke X. The arm support 33 is connected to each of the arms 3 via a respective link 35 to convert the tire building stroke X of the arm support 33 into the pivoting movement P of the arms 3 about their respective hinge ends 31 at the release member 61.

The tire building machine comprises one or more drive elements 4 to control the operation of the tire building drum 1. In this exemplary embodiment, the one or more drive elements 4 comprise a first drive element 41 to drive the movement of the base 11 of the drum body 10 in the axial direction A and a second drive element 42 to drive the pivoting movement of the arms 3 in the pivoting direction P. The one or more drive elements 4 may extend at, along or inside the drum shaft 2. In this particular example, the drum shaft 2 comprises a tubular wall 20 that defines a hollow interior 21 to receive the one or more drive elements 4. The tubular wall 20 and/or the base 11 are provided with one or more slots 22, 13 to facilitate a connection or coupling between the one or more drive elements 4 inside the drum shaft 2 and the tire building drum 1 outside the drum shaft 2. Preferably, the first drive element 41 and the second drive element 42 are push-pull rods that are individually movable in the axial direction A. More preferably, the push-pull rods are housed inside the drum shaft 2.

The one or more drive elements 4 are coupled to a control unit 40 outside or external to the tire building drum 1. Consequently, the operation of the tire building drum 1 is remote controlled by the control unit 40 via the one or more drive elements 4.

As shown in FIGS. 1 and 2, the tire building drum 1 comprises a base actuator 50 and an arm actuator 51 to actuate the movement of the base 11 in the axial direction A and the pivoting movement of the arms 3 in the pivoting direction P, respectively. The base actuator 50 and the arm actuator 51 are coupled to and driven by the first drive element 41 and the second drive element 42, respectively. As such, they are remote controlled or remotely controllable actuators 51, 52 of the tire building drum 1, because their respective movements are controlled by a control unit 40 that is located external to or outside of the tire building drum 1. In this exemplary embodiment, the base actuator 50 and the arm actuator 51 are coupling members that mechanically couple the base 11 and the arm support 33 to the first drive element 41 and the second drive element 42, respectively. Preferably, the coupling members are shaped as pins to mechanically engage the push-pull rods 41, 42. The base actuator 50 and the arm actuator are linearly driven in the axial direction A and can therefore be considered to be linear actuators.

The arm actuator 51 is coupled to the arm support 33. The arm actuator 51 is arranged to move together with the second drive element 42 in the axial direction A to cause movement of the arm support 33 within the tire building stroke X, which movement is converted by the link 35 between the arm support 33 and the arms 33 into the pivoting movement of the arms 33 in the pivoting direction P. As shown in FIG. 2, the arm actuator 51 is arranged to travel further in the release direction V1 beyond the tire building stroke X to move the release member 61 from the fixation position, as shown in FIG. 1, into the release position, as shown in FIG. 2. When moving in the release direction V1 beyond the tire building stroke X, the arms 3 are resting on the resting surface 34 of the arm support 33. As such, the links 35 can no longer pivot the arms 3 and instead are in a rigid relationship, via the arms 3, with the hinge ends 31 and the release member 61 coupled thereto. Consequently, a movement of the arm actuator 51 in the release direction V1 beyond the tire building stroke X is transmitted by the links onto the release member 61, which is then moved from the fixation position, as shown in FIG. 1, into the release position, as shown in FIG. 2.

As shown in FIG. 1, the tire building drum 1 further comprises a biasing member 8 that is arranged to bias the release member 61 with a biasing force in a biasing direction opposite to the release direction V1. In this exemplary embodiment, the biasing member 8 acts in the fixation direction W1 to force the release member 61 from the release position into the fixation position. During the tire building stroke X, the arm actuator 51 exerts a return force onto the plurality of arms 3 via the respective links 35, wherein at least a component of the return force is directed in the first release direction V1. The biasing force of the biasing member 8 is chosen such that it exceeds the return force during the tire building stroke X. Hence, the release member 61 can be kept in the fixation position at least during the tire building stroke X. In this way, it is prevented that the release functionality of the release member 61 interferes with the tire building process. In this exemplary embodiment, the biasing member 8 is arranged between the release member 61 and the base 11 to bias the release member 61 relative to said base 11.

When the arm actuator 51 moves in the release direction V1 beyond the tire building stroke X, the return force on the release member 61 increases and ultimately exceeds the biasing force, thereby allowing the release member 61 to move from the fixation position into the release position. The arm actuator 51 can thus be used in two ways; 1) to drive the pivoting of the arms 3 during the tire building stroke X, and 2) to drive the release member 61 in the release direction V1 outside of the tire building stroke X.

The release member 61 of the present invention can thus be controlled from a position spaced apart ('remote') from the release member 61 itself. In particular, the release member 61 is arranged to be remote controlled from a position that is at least twenty centimeters, preferably at least thirty centimeters and most preferably at least forty centimeters away from the bead-lock segment 12 in the first release direction V1. In this particular example, the release member 61 is remote controlled from a position beyond the fold line 93 of the uninflated bladder body 90 in the first release direction V1. Hence, the release member 61, which in itself is inaccessible because of the presence of the turn-up bladder 9 around the drum body 10, is remotely controllable from a position which is more easily accessible, i.e. by the control unit 40 outside the tire building drum 1 or by (manual) actuation of the actuator 51 from a position beyond the fold line 93 of the uninflated bladder body 90. Consequently, the operator does not need to manually reach into the tire building drum 1 or partially dismantle the tire building drum 1 to reach the release member 61.

Alternatively, the arm actuator 51 may hold the arm support 33, and thus the release member 61 connected thereto, in a stationary position while the base actuator 50 moves the drum body 10. It will be appreciated that this generates a relative movement between the release member 61 and the drum body 10 that still results in the same net movement of the release member 61 in the first release direction V1 with respect to or relative to the drum body 10.

A method for operating the aforementioned tire building drum 1 will be elucidated below with reference to FIGS. 1 and 2.

The method comprises the step of controlling the arm actuator 51 to move the remote controlled release member 61 in the first release direction V1 from the fixation position, as shown in FIG. 1, into the release position, as shown in FIG. 2, to release the first circumferential edge 91 from the drum body 10. The position of the arm actuator 51 is remote controlled by the control unit 40 external to the tire building drum 1. In particular, the control unit 40 is arranged for controlling the drive elements 41, 42 to drive the axial position of the base 11 and the arm actuator 51. The arm actuator 51 is moved in the tire building stroke X during the tire building process. When maintenance is required for the turn-up bladder 9, or when the turn-up bladder 9 is to be replaced in its entirety, the control unit 40 controls the second drive element 42 to move the arm actuator 51 in the release direction V1 beyond the tire building stroke X to move the arm actuator 51 into the release position. Preferably, the remote controlled release member 61 releases the entire first circumferential edge 91 from the drum body 10 in said release position. The first circumferential edge 91 can thus be released instantaneously along its entire circumferential length.

Figure 3:
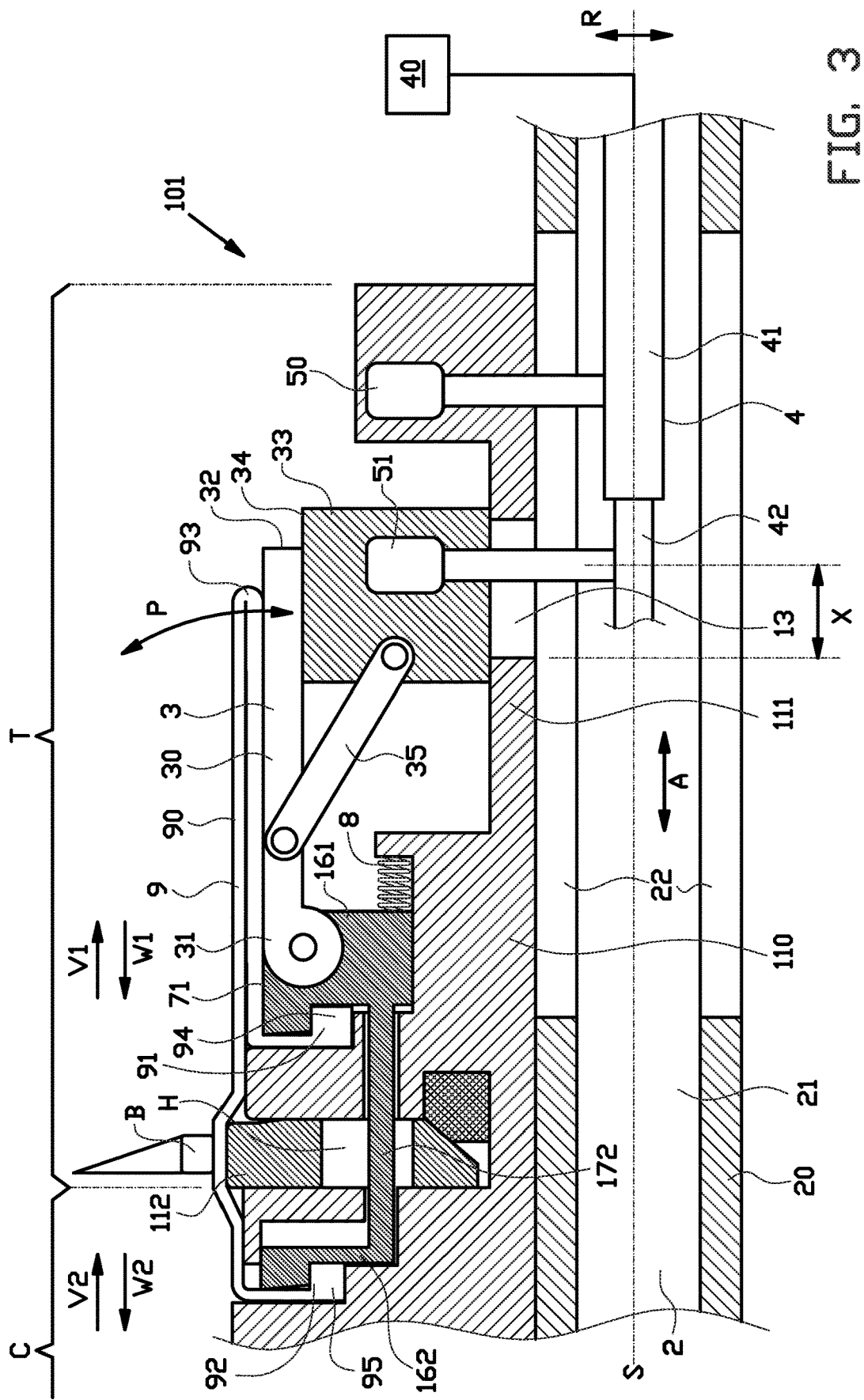
FIGS. 3 and 4 shows cross sections of an alternative tire building drum with a turn-up bladder and release members for releasing said turn-up bladder according to a second embodiment of the invention.
Figure 4:
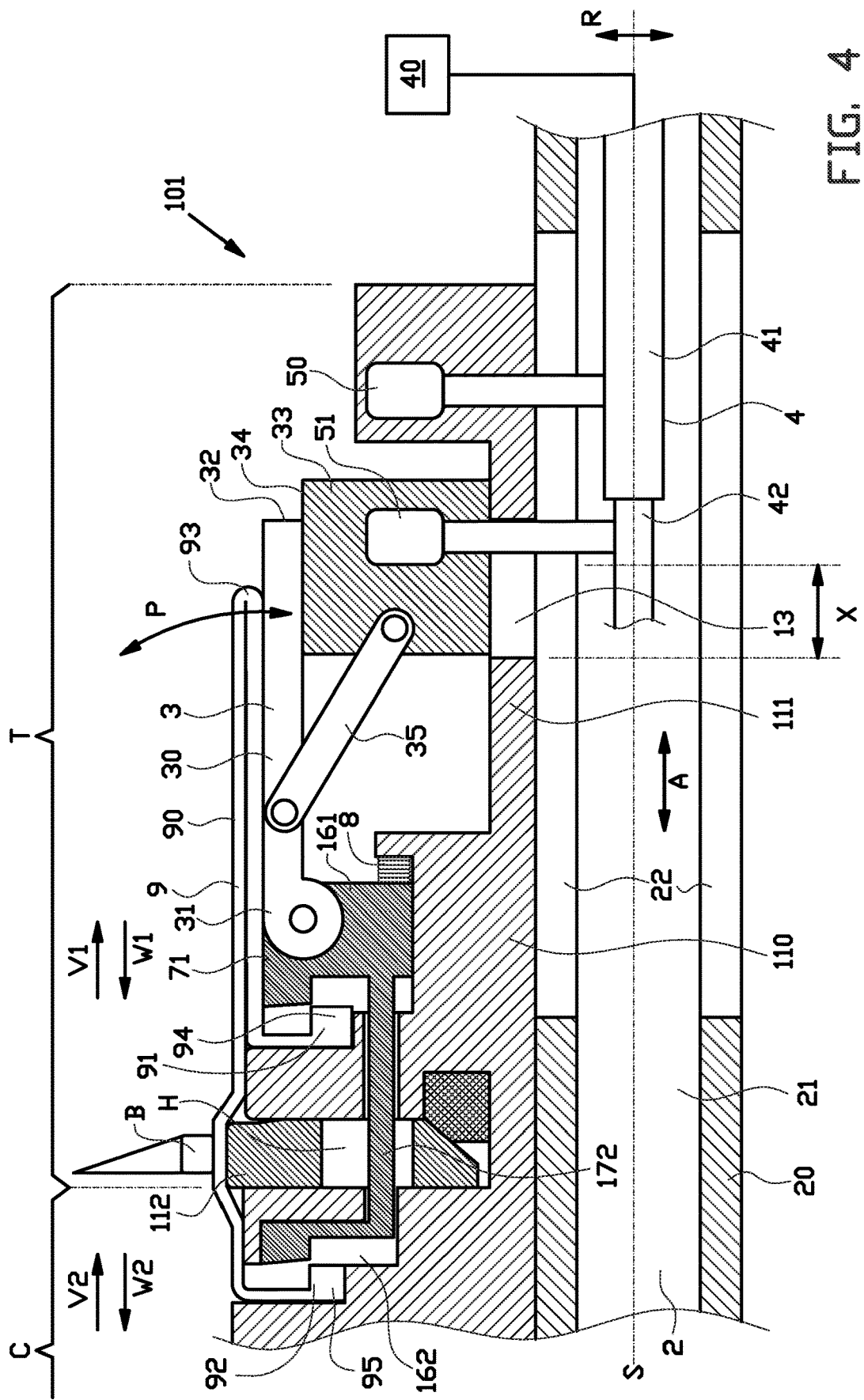

FIGS. 3 and 4 show an alternative tire building drum 101 according to a second embodiment of the invention. The alternative tire building drum 101 differs from the previously discussed tire building drum 1 in that it comprises a second release member 162 in addition to the aforementioned release member (the latter is from now on referred to as the first release member 161). The second release member 162 is movable with respect to the drum body 110 in a second release direction V2 from a second fixation position, as shown in FIG. 3, into a second release position, as shown in FIG. 4, and oppositely in a second fixation direction W2. In the second fixation position, the second release member 162 fixates the second circumferential edge 92 of the turn-up bladder 9 to the drum body 110 and in the second release position the second release member 162 releases the second circumferential edge 92 from the drum body 110. The second release member 162 is arranged to fixate the second circumferential edge 92 to the drum body 10 at the center section C.

The second release member 162 operates at the center section C in essentially the same way as the first release member 161 at the turn-up section T. In fact, the second release direction V2 and the second fixation direction W2 are the same as the first release direction V1 and the first fixation direction W1, respectively.

In this exemplary embodiment the first release member 161 and the second release member 162 are connected to move in unison from the first fixation position and the second fixation position, as shown in FIG. 3, into the first release position and the second release position, respectively, as shown in FIG. 4. In particular, the first release member 161 and the second release member 162 are connected by a bridge member 172. The alternative tire building drum 101 further comprises an alternative bead-lock segment 112 with a cavity, a channel or an opening H that allows passage of the bridge member 172 through the bead-lock segment 112 in the axial direction A.

Figure 5:
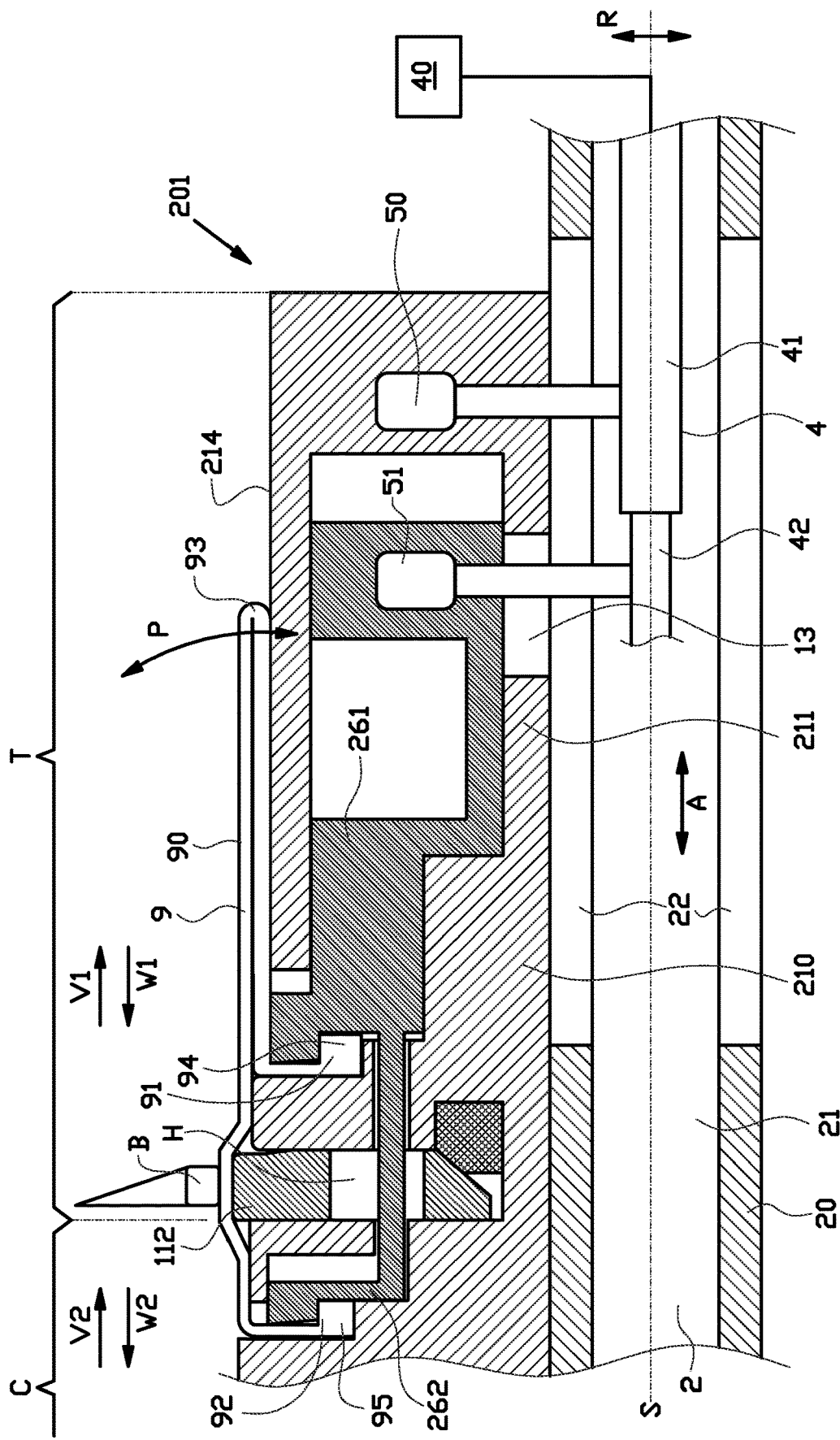
FIGS. 5 and 6 shows cross sections of a further alternative tire building drum with a turn-up bladder and release members for releasing said turn-up bladder according to a third embodiment of the invention.
Figure 6:
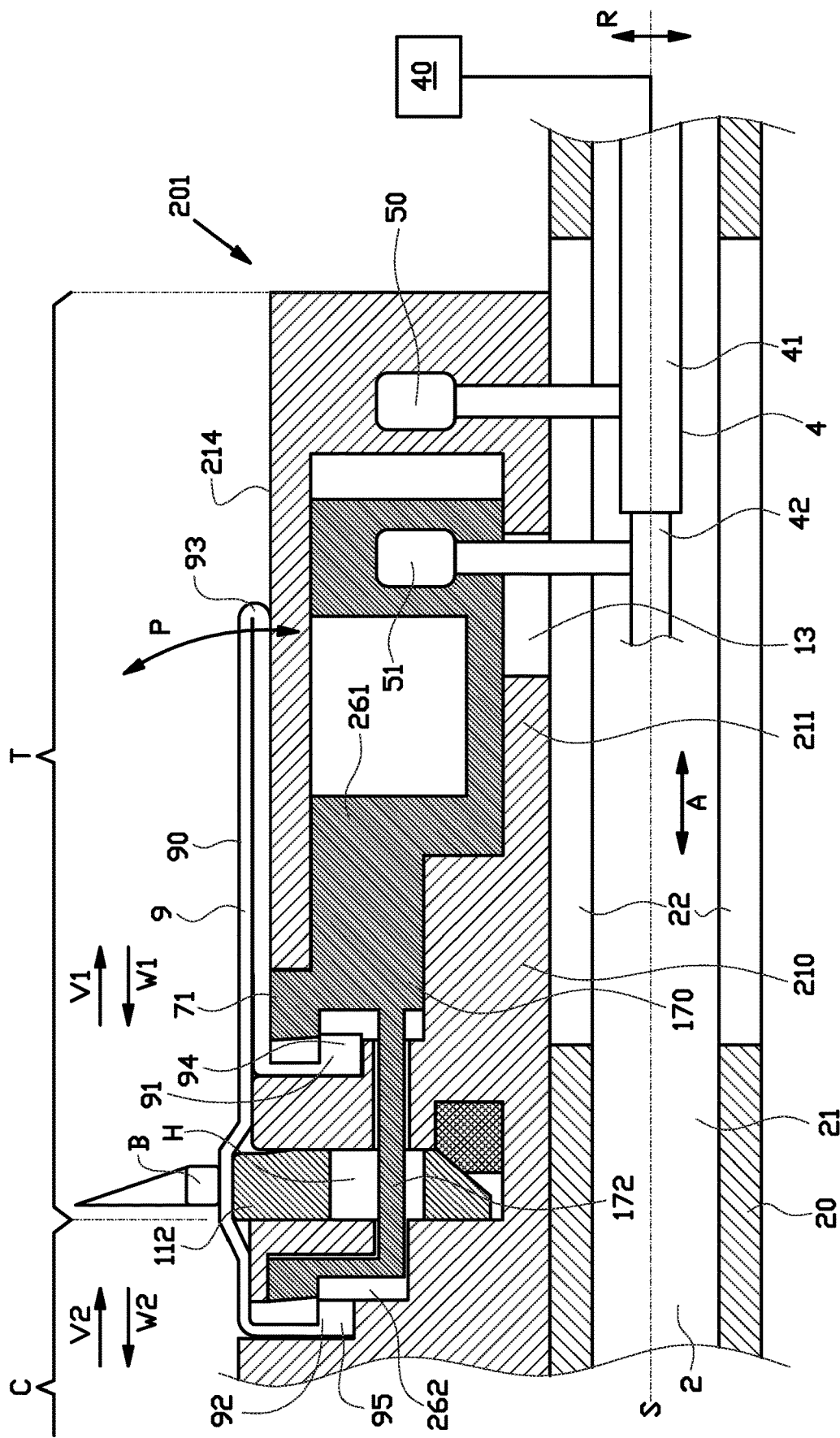

FIGS. 5 and 6 show a further alternative tire building drum 201 according to a third embodiment of the invention. The further alternative tire building drum 201 differs from the previously discussed alternative tire building drum 101 in that there are no arms. Instead, the drum body 210 features an alternative base 211 that forms a circumferential surface 214 for supporting the turn-up bladder 9. The turn-up bladder 9 is expanded relative to said circumferential surface 214 and pressed against the carcass at the center section C solely by the air pressure in the turn-up bladder 9. Hence, the actuator 51 connected to the second drive element 42 is solely arranged for driving the first release member 261 and/or the second release member 262. Consequently, there is also no tire building stroke associated with the actuator 5. In the absence of the arms, first release member 261 can be connected directly to the actuator 51.

Figure 7:
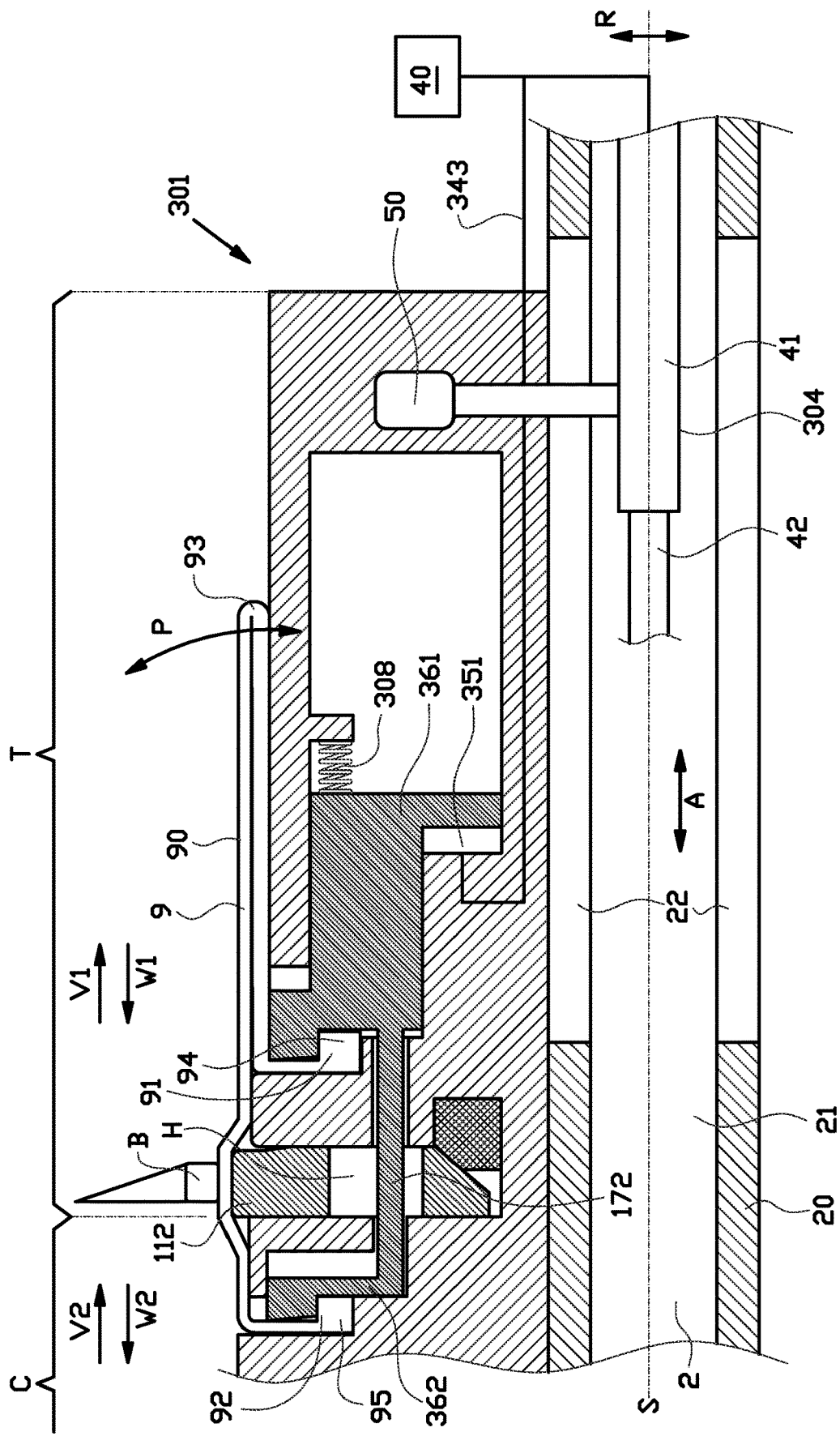
FIGS. 7 and 8 shows cross sections of a further alternative tire building drum with a turn-up bladder and release members for releasing said turn-up bladder according to a fourth embodiment of the invention.
Figure 8:
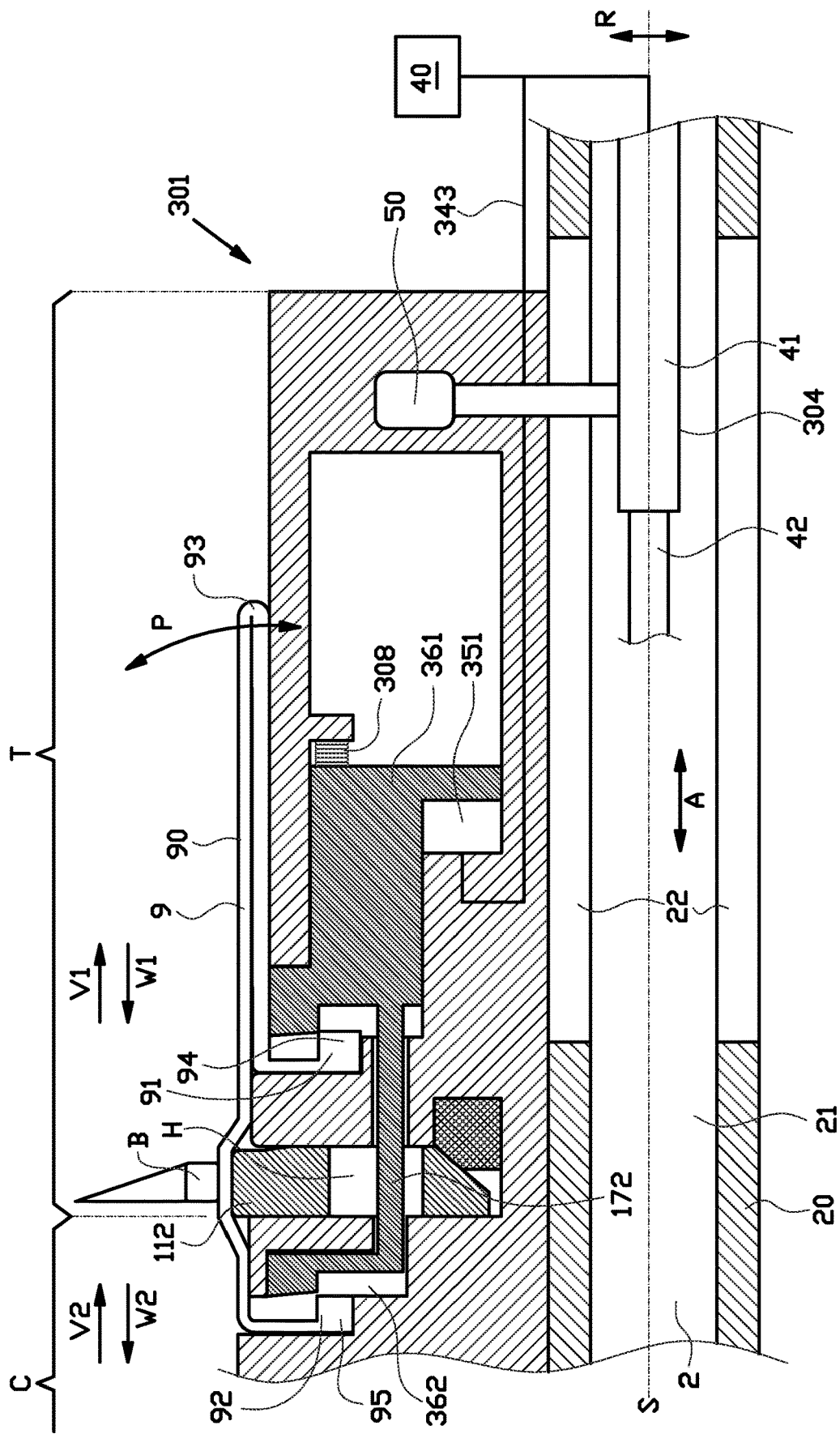

FIGS. 7 and 8 show a further alternative tire building drum 301 according to a fourth embodiment of the invention. The further alternative tire building drum 301 differs from the previously discussed further alternative tire building drum 201 in that it comprises an alternative actuator 351 in the form of a hydraulic or pneumatic chamber or cylinder. The further alternative tire building drum 301 is further provided with an alternative set of one or more drive elements 304, in particular comprising a pneumatic or hydraulic conduit 343 that is connected to an external source of pneumatic pressure, partial vacuum or hydraulic pressure (not shown). The alternative actuator 351 is connected in fluid communication with said conduit 343 in order to be remote controlled by the control unit 40. The first release member 361 and/or the second release member 362 are alternatively designed to be connected to or incorporate the chamber or cylinder of the alternative actuator 351. Preferably, the further alternative tire building drum 301 comprises an alternative biasing member 308 to bias the first release member 361 in the first fixation direction W1 from the first release position, as shown in FIG. 8, back into the first fixation position, as shown in FIG. 7.

Figure 9:
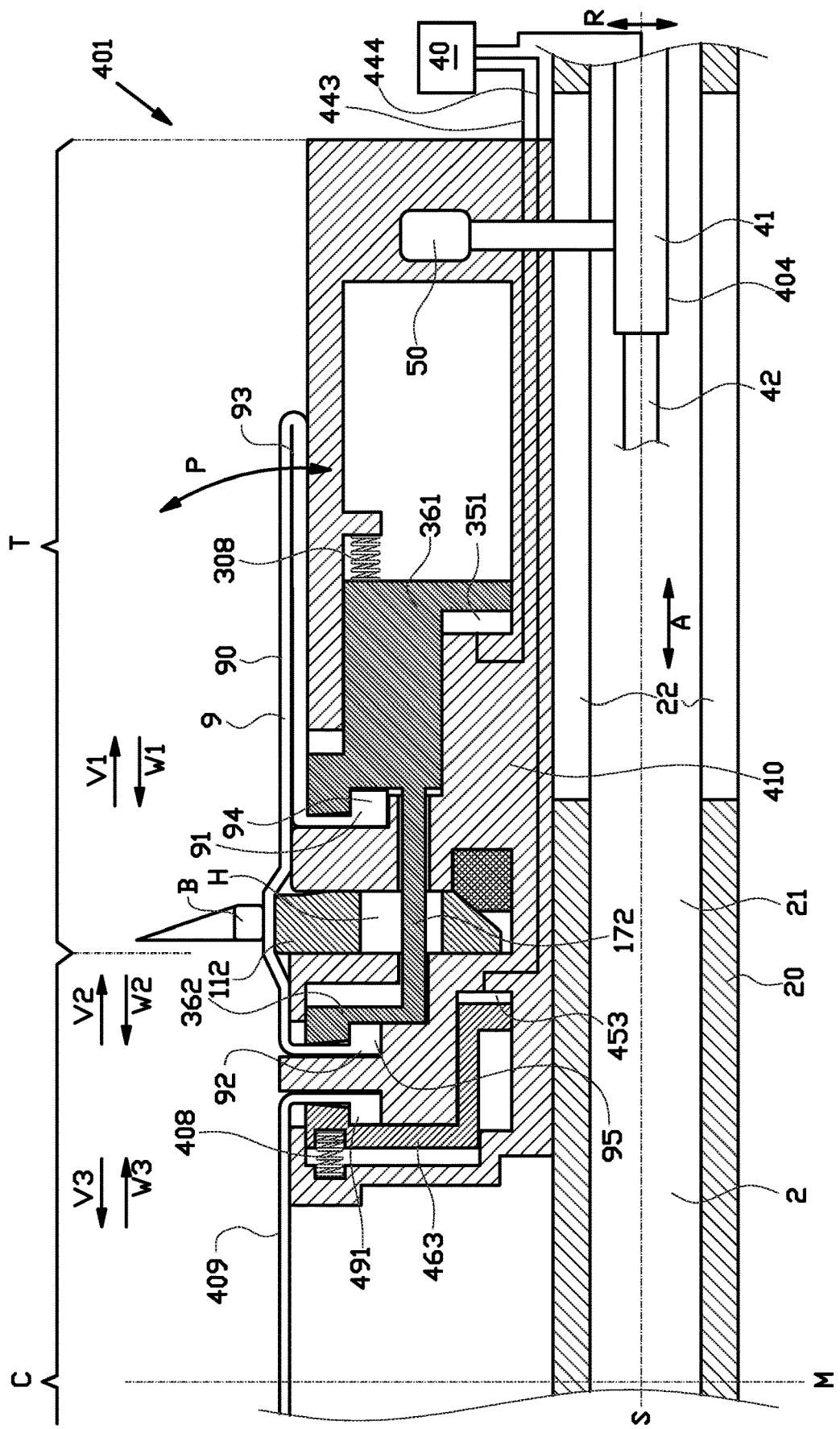
FIGS. 9 and 10 shows cross sections of a further alternative tire building drum with a turn-up bladder, a center sleeve and release members for releasing said turn-up bladder and said center sleeve according to a fifth embodiment of the invention.
Figure 10:
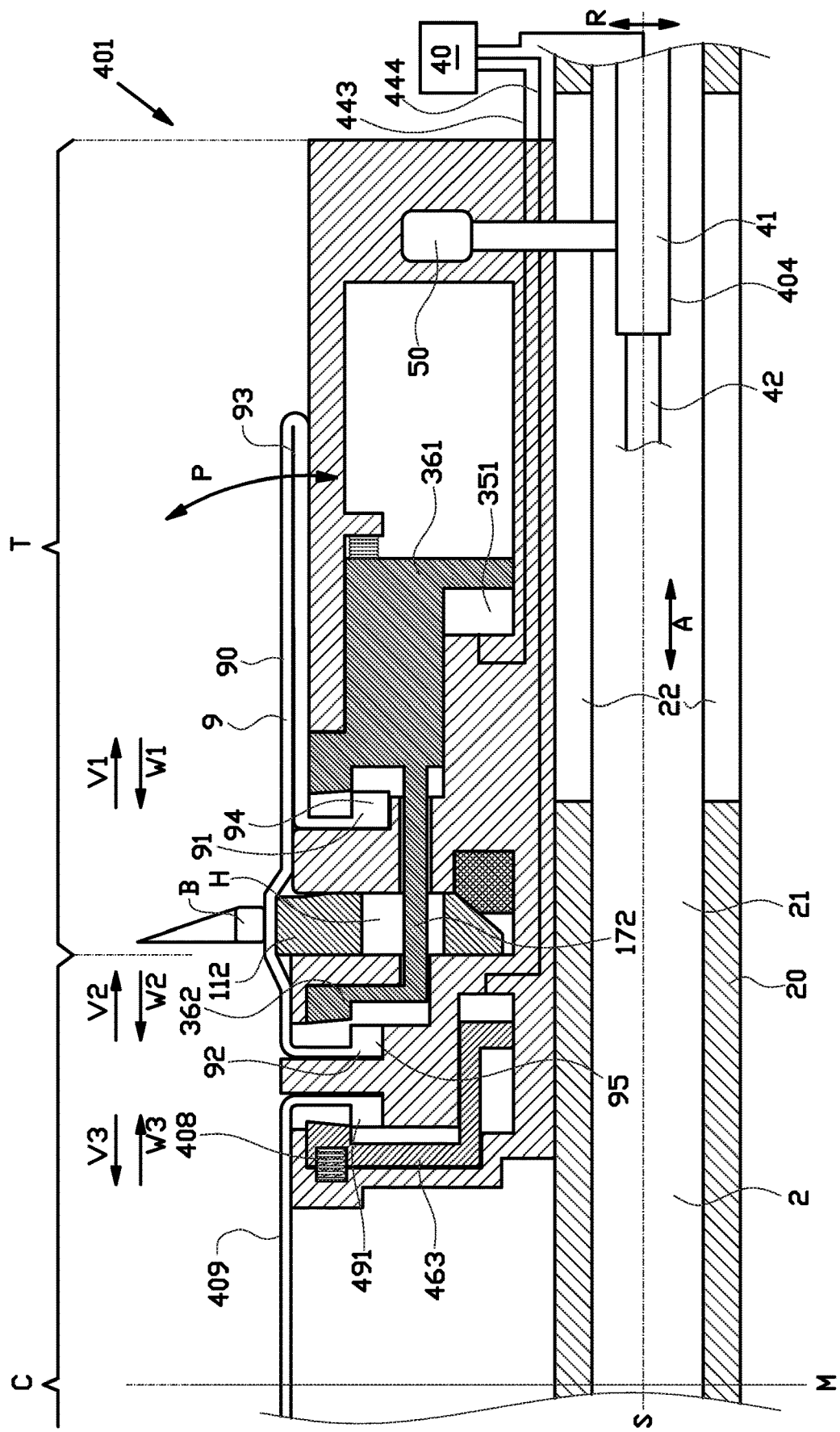

FIGS. 9 and 10 show a further alternative tire building drum 401 according to a fifth embodiment of the invention. The further alternative tire building drum 401 differs from the previously discussed further alternative tire building drum 301 in that it comprises a center sleeve 409 at the center section C in addition to the turn-up bladder 9 at the turn-up section T. The center sleeve 409 has a third circumferential edge 491 that extends in a circumferential direction about the central axis S around the drum body 410 and that is arranged to be mounted to said drum body 410 at a side of the bead-lock segments 112 directly opposite to the turn-up section T in the axial direction A. The body of the center sleeve 409 extends over the center section C across a mid-plane M of the further alternative tire building drum 401 up to a fourth circumferential edge (not shown) that is arranged to be mounted to the drum body 410 close to the turn-up section at the other end of the drum body 410. The center sleeve 409 is arranged to be expanded, i.e. by inflation or with mechanical means, to shape the carcass (not shown) at the center section C.

The further alternative tire building drum 401 further comprises a third release member 463 that is movable in a third release direction V3 from a third fixation position, as shown in FIG. 9, into a third release position, as shown in FIG. 10. In the third fixation position, the third release member 463 fixates the third circumferential edge 491 to the drum body 410 and in the third release position the third release member 463 releases the third circumferential edge 491 from the drum body 410. In this exemplary embodiment, the third release direction V3 is opposite to the first release direction V1.

The further alternative tire building drum 401 comprises an additional actuator 453 for moving said third release member 463 in the third release direction V3. Preferably, the additional actuator 453, like the alternative actuator 351 of the previous embodiment, takes the shape of a hydraulic or pneumatic chamber or cylinder. The further alternative tire building drum 401 is provided with an alternative set of one or more drive elements 404, in particular comprising a first pneumatic or hydraulic conduit 443 and a second pneumatic or hydraulic conduit 444 that are connected to an external source of pneumatic pressure, partial vacuum or hydraulic pressure (not shown). The alternative actuator 351 and the additional actuator 453 are connected to the first conduit 443 and the second conduit 444, respectively, in order to be remote controlled by the control unit 40. Preferably, the further alternative tire building drum 401 comprises an additional biasing member 408 to bias the third release member 463 in the third fixation direction W3 from the third release position, as shown in FIG. 10, back into the third fixation position, as shown in FIG. 9.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In particular, it will be apparent from the illustrated embodiments that the number of release members, the number of actuators can be varied. More in particular, each release member may be remote controlled individually by its own actuator. Also, the actuators may be any suitable actuator from the group comprising, but not limited to: linear actuators, non-linear actuators, mechanical actuators, electromechanical actuators, hydraulic actuators, pneumatic actuators or a combination thereof. The one or more drive elements may correspondingly be chosen from a group comprising, but not limited to: mechanical drive elements, hydraulic conduits, pneumatic conduits, electrical conductors or a combination thereof.

Figure 11:
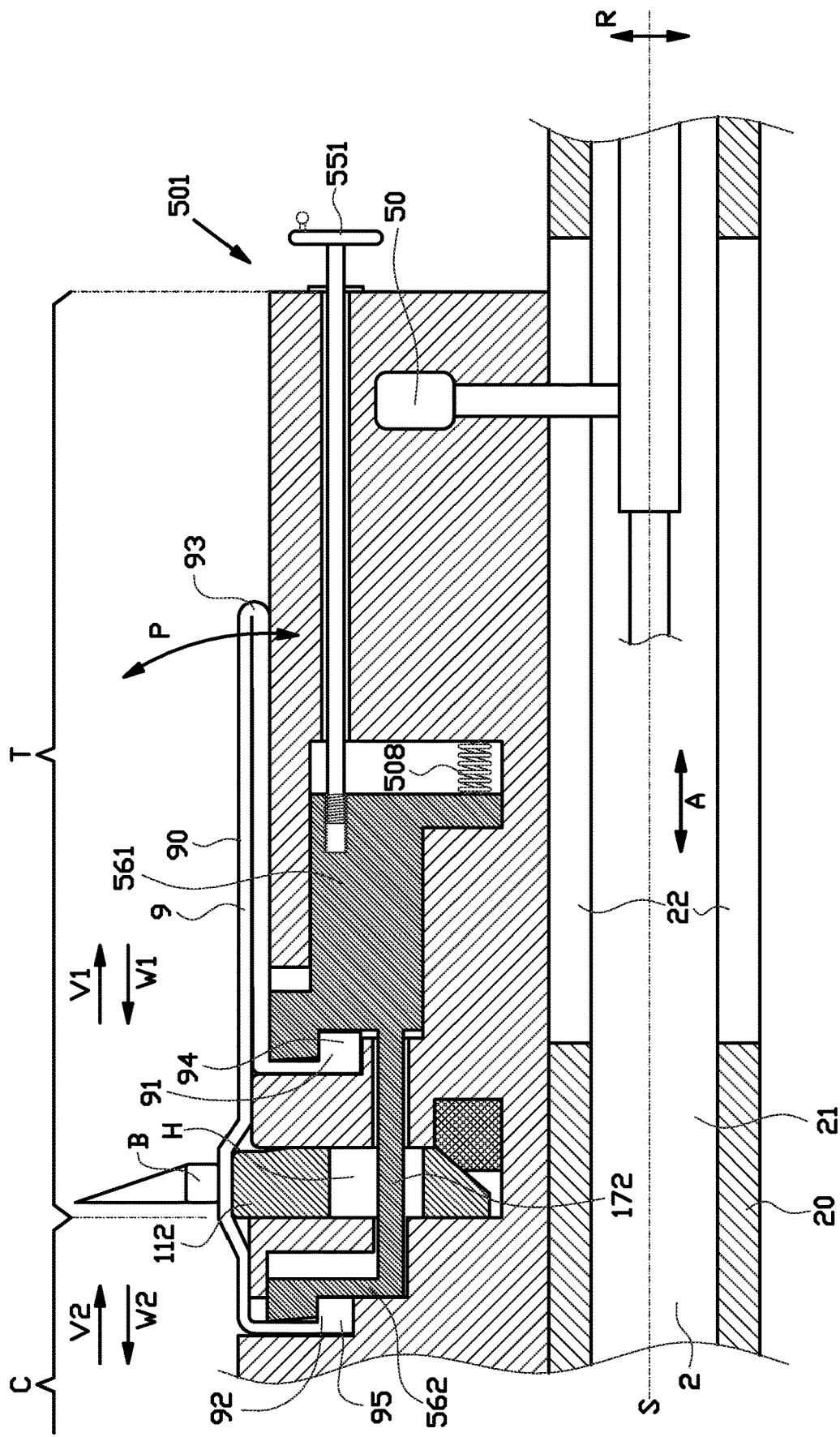
FIG. 11 shows a further alternative tire building drum according to a sixth embodiment of the invention with a manually controlled actuator for remotely controlling the release member.

The actuators may also be manually operated, as long as the manual interaction with the actuator occurs at a position spaced apart from the inaccessible position of the release members, i.e. outside of the uninflated bladder body 90 in the axial direction A. In particular, FIG. 11 shows an exemplary embodiment of a further alternative tire building drum 501 with a manually operated actuator 551, i.e. a rod with a wheel at the end, extending parallel to the axial direction A from a position outside of the base up to the first release member 561 and/or the second release member 562. The manually operated actuator 551 may be coupled to the first release member 561 via a threaded coupling that converts rotation of the rod into a linear translation of the first release member 561 in the first release direction V1. Alternatively, the manually operated actuator 551 may simply be arranged for pulling or pushing the first release member 561 in the axial direction A. Optionally, the first release member 561 may be biased by a biasing member 508 to move into the first fixation position, in a similar way as in the previously discussed embodiments.

Moreover, as previously discussed, the one or more actuators 51, 351, 453, 551 may hold the one or more release members 61, 161, 162, 261, 262, 361, 362, 463, 561, 562 stationary while the drum body 10, 110, 210 is being moved. It will be appreciated that this generates a relative movement between the one or more release members and the drum body 10, 110, 210 that still results in the net movement of said one or more release members 61, 161, 162, 261, 262, 361, 362, 463, 561, 562 with respect to or relative to the drum body 10, 110, 210.

Moreover, the actuators may be removable from the tire building drum. The actuators may for example be coupled to the release member only when said release member is to be moved. As such, the release member is arranged to be coupled to and remote controlled by the actuator. An actuator clearly intended for use in combination with the tire building drum thus also falls within the scope of the invention.

LIST OF REFERENCE NUMERALS 1 tire building drum
10 drum body
11 base
12 bead-lock segment
13 slot
2 drum shaft
20 tubular wall
21 hollow interior
22 slot
3 arm
30 arm body
31 hinge end
32 distal end
33 arm support
34 resting surface
35 link
4 one or more drive elements
40 control unit
41 first drive element
42 second drive element
50 base actuator
51 arm actuator
61 first release member
70 annular body
71 flange or rim
8 biasing member
9 turn-up bladder
90 inflatable bladder body
91 first circumferential edge
92 second circumferential edge
93 fold line
94 flange or rim
95 flange or rim
101 alternative tire building drum
110 drum body
112 alternative bead-lock segment
161 first release member
162 second release member
172 bridge member
201 further alternative tire building drum
210 drum body
211 alternative base
214 stationary circumferential surface
261 first release member
262 second release member
301 further alternative tire building drum
304 alternative set of one or more drive elements
308 alternative biasing member
343 conduit
351 actuator
361 alternative first release member 362 alternative second release member
401 further alternative tire building drum
404 alternative set of one or more drive elements
443 first conduit
444 second conduit
453 third actuator
463 third release member
408 additional biasing member
409 center sleeve
491 third circumferential edge
501 further alternative tire building drum
508 biasing member
551 manually controlled actuator
561 first release member
562 second release member
A axial direction
B bead
C center section
H opening
M mid-plane
P pivoting direction
R radial direction
S central axis
T turn-up section
V1 first release direction
V2 second release direction
V3 third release direction
W1 first fixation direction
W2 second fixation direction
W3 third fixation direction
X tire building stroke

The invention claimed is:

1. A tire building drum with a first turn-up bladder, wherein the tire building drum comprises a drum body that is rotatable about a central axis extending in an axial direction, wherein the tire building drum comprises a center section for shaping a carcass and a turn-up section for turning-up one or more tire components against the shaped carcass at the center section, wherein the first turn-up bladder has a first circumferential edge a second circumferential edge opposite to the first circumferential edge in the axial direction, and an inflatable bladder body extending between the first circumferential edge and the second circumferential edge, wherein the bladder body, when uninflated, folds onto itself about a fold line at a side of the first circumferential edge opposite to the second circumferential edge in the axial direction, wherein the first circumferential edge and the second circumferential edge extend in a circumferential direction about the central axis around the drum body, wherein the tire building drum comprises a first release member and a first actuator for generating a relative movement between said first release member and the drum body to move said first release member in a first release direction with respect to the drum body from a first fixation position in which the first release member fixates the first circumferential edge to the drum body into a first release position in which the first release member releases the first circumferential edge from the drum body, wherein the first release member is located in the axial direction between the second circumferential edge and the fold line of the uninflated bladder body and covered by said uninflated bladder body in a radial direction perpendicular to the central axis.

2. The tire building drum according to claim 1, wherein the first release member is a first remote controlled release member, wherein the first actuator is arranged for moving said first remote controlled release member from the first fixation position into the first release position.

3. The tire building drum according to the claim 1, wherein the first release member is arranged to be remote controlled from a position that is spaced apart from the first fixation position over at least twenty centimeters.

4. The tire building drum according to claim 1, wherein the first release direction is parallel to the central axis.

5. The tire building drum according to claim 1, wherein the first actuator is a linear actuator that acts in the first release direction.

6. The tire building drum according to claim 1, wherein the tire building drum is arranged to be connected to one or more drive elements, wherein the first actuator is arranged to be driven by one of the one or more drive elements.

7. The tire building drum according to claim 6, wherein the tire building drum is arranged to be mounted concentrically to a drum shaft at the central axis, wherein the one or more drive elements extend inside, at or alongside the drum shaft.

8. The tire building drum according to claim 1, wherein the first release member is arranged to release the entire first circumferential edge from the drum body in the first release position.

9. The tire building drum according to claim 1, wherein the tire building drum comprises a biasing member to bias the first release member from the first release position into the first fixation position in a biasing direction opposite to the first release direction.

10. The tire building drum according to claim 1, wherein the first actuator is arranged for driving at least one other component of the tire building drum during a tire building operation, wherein the first actuator is arranged to travel back and forth within a tire building stroke during the tire building operation to drive the at least one other component, wherein the first release member is arranged to remain in the first fixation position during the tire building stroke, wherein the first actuator is arranged to travel further in the first release direction beyond the tire building stroke to move the first release member from the first fixation position into the first release position.

11. The tire building drum according to claim 10, wherein the tire building drum comprises a plurality of arms distributed around the drum body in the circumferential direction and pivotable between a rest position at the drum body and a pressing position at least partially away from the drum body, wherein the at least one other component comprises the plurality of arms.

12. The tire building drum according to claim 11, wherein the plurality of arms are hingably coupled to the first release member to pivot relative to the first release member between the rest position and the pressing position, wherein the first actuator is connected to each of the arms via a respective link to convert the tire building stroke of the first actuator in the first release direction into a pivoting movement of the arms relative to the first release member, wherein the tire building drum is provided with a resting surface that supports the plurality of arms in the rest position with respect to the drum body, wherein the links in the rest position are arranged to transmit further movement of the first actuator in the first release direction via the plurality of arms onto the first release member.

13. The tire building drum according to claim 12, wherein the first actuator is arranged to exert a return force onto the plurality of arms via the respective links, wherein at least a component of the return force is directed in the first release direction, wherein the tire building drum comprises a biasing member to bias the first release member from the first release position into the first fixation position with a biasing force in a biasing direction opposite to the first release direction, wherein the biasing force exceeds the return force during the tire building stroke.

14. The tire building drum according to claim 1, wherein the tire building drum comprises a second release member that is movable with respect to the drum body in a second release direction from a second fixation position in which the second release member fixates the second circumferential edge to the drum body into a second release position in which the second release member releases the second circumferential edge from the drum body.

15. The tire building drum according to claim 1, wherein the tire building drum comprises a second bladder or sleeve with a third circumferential edge that extends in a circumferential direction about the central axis around the drum body, wherein the tire building drum further comprises a third release member that is movable with respect to the drum body in a third release direction from a third fixation position in which the third release member fixates the third circumferential edge to the drum body into a third release position in which the third release member releases the third circumferential edge from the drum body.

16. The tire building drum according to claim 1, wherein the first release member is arranged to be remote controlled from a position outside of the uninflated bladder body in the axial direction.

17. The tire building drum according to claim 16, wherein the first release member is arranged to be remote controlled from a position beyond the fold line of the uninflated bladder body in the first release direction.

18. The tire building drum according to claim 1, wherein the second bladder or sleeve is a center sleeve that is arranged to be expanded at the center section.

19. The tire building machine comprising a tire building drum according to claim 1, wherein the tire building machine further comprises one or more drive elements, wherein the first actuator is arranged to be driven by one of the one or more drive elements.

20. The tire building machine according to claim 19, wherein the tire building machine further comprises a control unit that is arranged for controlling the one drive element such that the first release member is moved from the first fixation position into the first release position.

21. A method for operating a tire building drum according to claim 1, wherein the method comprises the step of controlling the first actuator to generate the relative movement between the first release member and the drum body to move said first release member in the first release direction with respect to the drum body from the first fixation position into the first release position to release the first circumferential edge from the drum body.

* * * * *

UNITED STATES PATENT AND TRADEMARK OFFICE
CERTIFICATE OF CORRECTION

| | |
|---|---|
| PATENT NO. | : 11,518,128 B2 |
| APPLICATION NO. | : 17/275600 |
| DATED | : December 6, 2022 |
| INVENTOR(S) | : De Graaf et al. |

It is certified that error appears in the above-identified patent and that said Letters Patent is hereby corrected as shown below:

In the Claims

Claim 18, Column 18, Line 5, "according to claim 1," should be --according to claim 15,--.

Signed and Sealed this
Eighth Day of October, 2024

Katherine Kelly Vidal
*Director of the United States Patent and Trademark Office*